(12) United States Patent
Kunow et al.

(10) Patent No.: US 7,453,170 B2
(45) Date of Patent: Nov. 18, 2008

(54) UNIVERSAL ENERGY SUPPLY SYSTEM

(75) Inventors: Peter Kunow, Berlin (DE); Klaus Biester, Wienhausen (DE)

(73) Assignee: Cameron International Corporation, Houston, TX (US)

( * ) Notice: Subject to any disclaimer, the term of this patent is extended or adjusted under 35 U.S.C. 154(b) by 344 days.

(21) Appl. No.: 10/489,583

(22) PCT Filed: Sep. 18, 2002

(86) PCT No.: PCT/EP02/10468

§ 371 (c)(1),
(2), (4) Date: Aug. 5, 2004

(87) PCT Pub. No.: WO03/026114

PCT Pub. Date: Mar. 27, 2003

(65) Prior Publication Data

US 2004/0252431 A1    Dec. 16, 2004

(30) Foreign Application Priority Data

Sep. 19, 2001   (DE) ............................ 201 15 473 U

(51) Int. Cl.
*G05F 3/06* (2006.01)
(52) U.S. Cl. .................................. 307/151; 307/43
(58) Field of Classification Search ................. 307/151, 307/43; 340/538; 363/21.12–21.18
See application file for complete search history.

(56) References Cited

U.S. PATENT DOCUMENTS 1,979,425 A    11/1934   Van Der Woude
2,387,800 A    10/1945   Leland et al. ................. 318/14
3,275,737 A    9/1966    Caller (Continued)

FOREIGN PATENT DOCUMENTS

DE    33 03 248    8/1984

(Continued)

OTHER PUBLICATIONS

International Search Report for Appln. No. PCT/EP02/10469 dated Oct. 23, 2003 (pp. 14).

(Continued)

*Primary Examiner*—Stephen W Jackson
*Assistant Examiner*—Carlos Amaya
(74) *Attorney, Agent, or Firm*—Conley Rose, P.C.

(57) ABSTRACT

A universal energy supply system for at least one electrical consumer comprises at least one AC voltage source and a cable connection connecting the source with the electrical consumer, wherein an AC/DC converting means is assigned to the AC voltage source for converting the AC voltage into DC voltage which DC voltage can be supplied to the electrical consumer via the cable connection. To improve such a universal energy supply system in that with small constructional efforts and with low costs, the energy supply to an electrical consumer is guaranteed also over great distances and the corresponding voltage supply is stabilized, the efficiency being relatively high at the same time and the system being redundant, the AC/DC conversion means comprises a number of AC/DC converting units which are connected in parallel with the AC voltage source on the input side and are serially connected to the electric consumer on the output side, each converting unit being constructed as a blocked switch mode power supply.

16 Claims, 2 Drawing Sheets

U.S. PATENT DOCUMENTS

Figure 1:
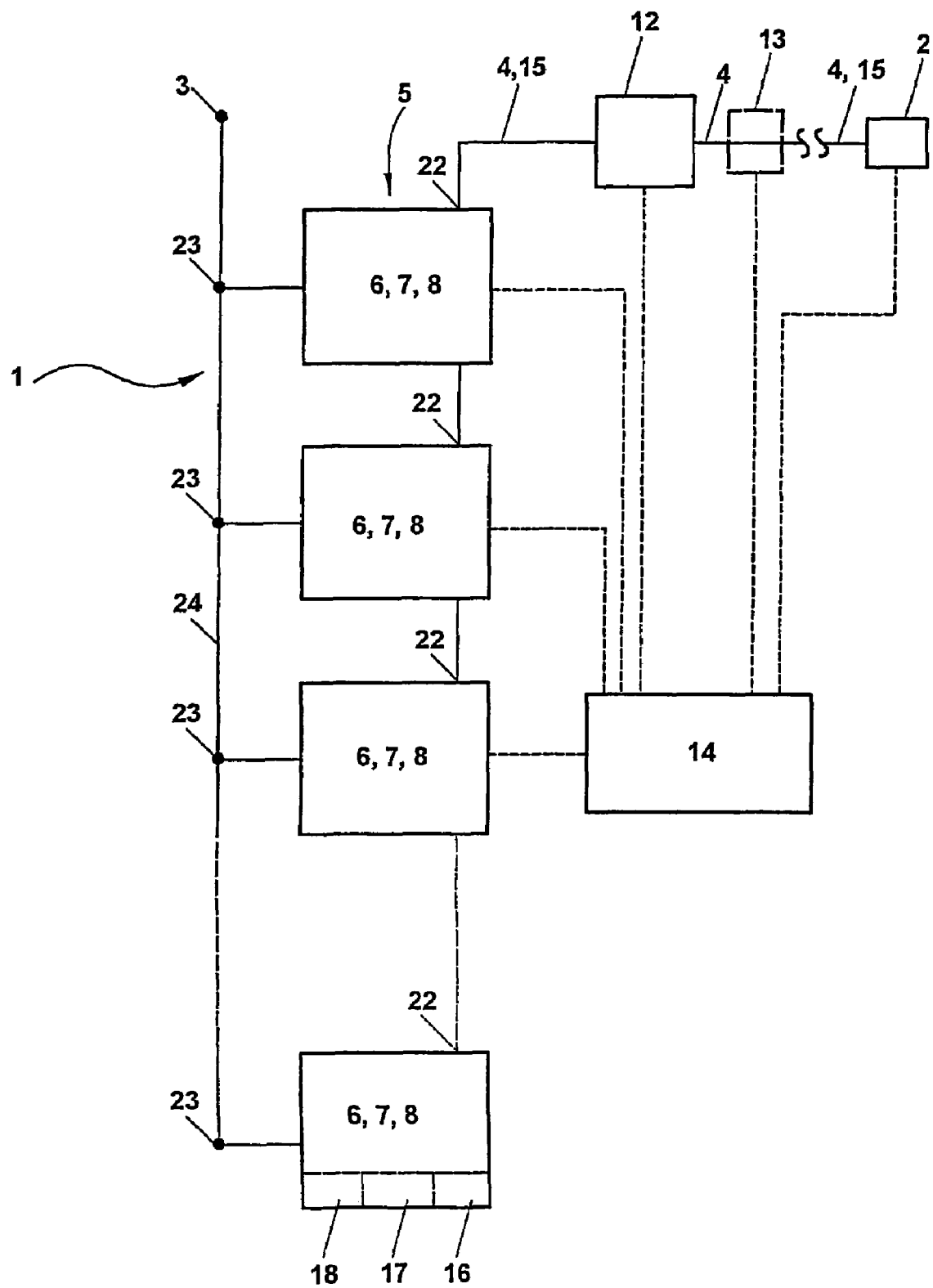

| | | | |
|---|---|---|---|
| 3,324,741 A | 6/1967 | Anderson | |
| 3,353,594 A | 11/1967 | Lewis | |
| 3,887,898 A | 6/1975 | Jones | |
| 3,980,808 A | 9/1976 | Kikuchi et al. | |
| 4,062,057 A | 12/1977 | Perkins et al. | |
| 4,124,884 A | 11/1978 | Episcopo | |
| 4,290,101 A | 9/1981 | Hergenhan | 363/65 |
| 4,363,975 A | 12/1982 | Beattie | |
| 4,423,747 A | 1/1984 | Heiser et al. | |
| 4,500,832 A | 2/1985 | Mickiewicz | 323/340 |
| 4,521,642 A | 6/1985 | Vives | 174/70 |
| 4,533,987 A | 8/1985 | Tomofuji et al. | |
| 4,548,383 A | 10/1985 | Wölfges | |
| 4,617,501 A | 10/1986 | Smith | |
| 4,639,714 A | 1/1987 | Crowe | |
| 4,745,815 A | 5/1988 | Klopfenstein | |
| 4,788,448 A | 11/1988 | Crowe | 307/31 |
| 4,814,963 A | 3/1989 | Petersen | |
| 4,920,811 A | 5/1990 | Hopper | |
| 5,031,088 A | 7/1991 | Tanaka | 363/71 |
| 5,055,991 A * | 10/1991 | Carroll et al. | 363/56.11 |
| 5,105,351 A | 4/1992 | Harada et al. | |
| 5,138,249 A | 8/1992 | Capel | |
| 5,168,422 A | 12/1992 | Duncan | |
| 5,195,721 A | 3/1993 | Akkerman | |
| 5,230,033 A | 7/1993 | Soodak | |
| 5,285,563 A | 2/1994 | Nove et al. | |
| 5,297,015 A * | 3/1994 | Miyazaki et al. | 363/146 |
| 5,301,096 A | 4/1994 | Klontz et al. | |
| 5,311,419 A | 5/1994 | Shires | |
| 5,418,707 A * | 5/1995 | Shimer et al. | 363/65 |
| 5,489,897 A | 2/1996 | Inoue | |
| 5,508,903 A | 4/1996 | Alexandrov | |
| 5,563,780 A | 10/1996 | Goad | |
| 5,572,182 A | 11/1996 | De Pinho Filho et al. | |
| 5,573,032 A | 11/1996 | Lenz et al. | 137/486 |
| 5,610,452 A | 3/1997 | Shimer et al. | |
| 5,629,844 A | 5/1997 | Krichtafovitch et al. | |
| 5,682,303 A | 10/1997 | Goad | |
| 5,731,969 A | 3/1998 | Small | |
| 5,754,028 A | 5/1998 | Vezzini | |
| 5,825,638 A | 10/1998 | Shutts | 363/21 |
| 5,832,996 A | 11/1998 | Carmody et al. | |
| 5,923,550 A | 7/1999 | Kumar | 363/69 |
| 5,982,645 A | 11/1999 | Levran et al. | |
| 5,983,743 A | 11/1999 | McGregor et al. | |
| 5,984,260 A | 11/1999 | Rawson et al. | |
| 6,032,924 A | 3/2000 | Castle | |
| 6,041,667 A | 3/2000 | Pischinger et al. | |
| 6,073,907 A | 6/2000 | Schreiner, Jr. et al. | |
| 6,094,366 A | 7/2000 | Kalfhaus | |
| 6,095,487 A | 8/2000 | Waber | 251/129.11 |
| 6,152,167 A | 11/2000 | Baker | |
| 6,154,381 A | 11/2000 | Kajouke et al. | |
| 6,158,295 A | 12/2000 | Nielsen | |
| 6,181,576 B1 | 1/2001 | Ikeda et al. | |
| 6,269,015 B1 | 7/2001 | Ikeda et al. | |
| 6,356,384 B1 | 3/2002 | Islam | |
| 6,385,057 B1 | 5/2002 | Barron | 363/17 |
| 6,388,904 B2 | 5/2002 | Nomura | 363/71 |
| 6,411,527 B1 | 6/2002 | Reinold | |
| 6,446,519 B1 | 9/2002 | Biester | |
| 6,494,257 B2 | 12/2002 | Bartlett et al. | 166/86.2 |
| 6,559,385 B1 | 5/2003 | Johnson et al. | 174/126.1 |
| 6,595,487 B2 | 7/2003 | Johansen et al. | |
| 6,615,916 B1 | 9/2003 | Vachon | 166/250.01 |
| 6,668,639 B2 | 12/2003 | Fong et al. | |
| 6,965,302 B2 | 11/2005 | Mollenkopf et al. | |
| 6,998,962 B2 * | 2/2006 | Cope et al. | 370/351 |
| 7,075,414 B2 * | 7/2006 | Giannini et al. | 340/310.11 |
| 7,264,057 B2 | 9/2007 | Rytlewski et al. | |
| 2001/0012207 A1 | 8/2001 | Nomura | |
| 2005/0013148 A1 * | 1/2005 | Kunow et al. | 363/65 |
| 2005/0029476 A1 * | 2/2005 | Biester et al. | 251/58 |

FOREIGN PATENT DOCUMENTS

| | | |
|---|---|---|
| DE | 33 16 258 | 11/1984 |
| DE | 34 17 455 | 11/1985 |
| DE | 34 24 041 | 1/1986 |
| DE | 38 32 304 | 3/1990 |
| DE | 43 44 709 | 6/1993 |
| DE | 44 14 677 | 11/1995 |
| DE | 196 14 627 | 10/1997 |
| DE | 197 14 552 | 10/1998 |
| DE | 197 50 041 | 1/1999 |
| DE | 199 09 712 | 7/2000 |
| DE | 199 63 105 | 6/2001 |
| EP | 0 028 296 | 5/1981 |
| EP | 0 303 801 | 6/1986 |
| EP | 0 626 670 | 11/1994 |
| EP | 0 384 607 | 6/1995 |
| EP | 1 024 422 | 8/2000 |
| EP | 1 107 437 | 6/2001 |
| EP | 1 244 203 | 9/2002 |
| GB | 1001629 | 8/1965 |
| GB | 2 141 882 | 1/1985 |
| GB | 2 266 942 | 11/1993 |
| JP | 59 103570 | 6/1984 |
| JP | 61 076071 | 4/1986 |
| JP | 61 240858 | 3/1987 |
| JP | 62 217857 | 9/1987 |
| JP | 63 308420 | 12/1988 |
| JP | 01 114368 | 5/1989 |
| JP | 02 206362 | 8/1990 |
| JP | 03 065054 | 3/1991 |
| JP | 03 150068 | 10/1991 |
| JP | 04 200270 | 7/1992 |
| JP | 05 327381 | 12/1993 |
| JP | 07 154967 | 6/1995 |
| JP | 08 338391 | 12/1996 |
| SU | 1270293 | 11/1986 |
| WO | WO95/20836 | 8/1995 |
| WO | WO 96/28878 | 9/1996 |
| WO | WO 97/38479 | 10/1997 |
| WO | WO 98/30816 | 7/1998 |
| WO | WO 99/37009 | 7/1999 |
| WO | WO 01/37411 | 5/2001 |
| WO | WO 01/52397 | 7/2001 |
| WO | WO01/84689 | 8/2001 |

OTHER PUBLICATIONS

Partial International Search Report for Appln No. PCT/EP02/10469 dated May 16, 2003 (pp. 7).

International Search Report for Appln. No. PCT/EP02/10471 dated Jul. 14, 2003 (pp. 12).

German Search Report for Appln. No. 200 18 560.8; Dated Oct. 23, 2001 (pp. 4).

German Search Report for Appln. No. 200 18 562.4; Dated Jul. 11, 2001 (pp. 4).

International Search Report for Appln. No. PCT/EP/12548 dated May 17, 2002 (pp. 2).

International Search Report for Appln. No. PCT/EP01/12550 dated Feb. 26, 2002 (pp. 6).

International Search Report for Appln. No. PCT/EP01/09513 dated Mar. 6, 2002 (pp. 7).

J. R. Pinheiro et al; *Isolated Interleaved-Phase-Shift-PWM de-dc ZVS Converters*; IEEE 2000; (pp. 2383-2388).

Rene Torrico-Bascope et al; *Dual-Bridge DC-DC Converter with Soft Switching Features*; IEEE 2001; (pp. 722-727).

Demercil S. Oliveira et al; *A Lossless Commutation PWM Two Level Forward Converter Operating Like a Full-Bridge*; IEEE 2000 (pp. 334-338).

Demercil S. Oliveira et al; *A Lossless Commutation PWM Two Level Forward Converter*; IEEE 2000 (pp. 582-588).

J. E. Baggio et al; *An Improved Full-Load-Range Isolated ZVS-PWM DC-DC Converter*; IEEE 2001 (pp. 708-714).

British Combined Search and Examination Report for Appln. No. GB0603306.2 dated Mar. 14, 2006 (pp. 5).

British Combined Search and Examination Report for Appln. No. GB0603307.0 dated Mar. 14, 2006 (pp. 6).

British Combined Search and Examination Report for Appln. No. GB0603309.6 dated Mar. 14, 2006 (pp. 6).

International Search Report for Appl. No. PCT/US05/14593 dated Sep. 29, 2006 (6 p.).

Office Action dated Dec. 19, 2006 for U.S. Appl. No. 10/489,533 (16 p).

Office Action dated Feb. 23, 2007 for U.S. Appl. No. 10/836,559 (20 p.).

Office Action dated Nov. 17, 2005 for U.S. Appl. No. 10/415,510 (19 p.).

Office Action dated May 16, 2006 for U.S. Appl. No. 10/415,510 (19 p.).

Office Action dated Aug. 14, 2006 for U.S. Appl. No. 10/415,510 (22 p.).

Office Action dated Jan. 31, 2007 for U.S. Appl. No. 10/415,510 (21 p.).

Office Action dated Aug. 30, 2006 for U.S. Appl. No. 10/836,559 (15 p.).

Office Action dated May 30, 2007 for U.S. Appl. No. 10/489,573 (37 p).

Office Action dated Dec. 8, 2005 for U.S. Appl. No. 10/489,533 (20 p.).

Final Office Action dated Jul. 28, 2006 for U.S. Appl. No. 10/489,533 (19 p.).

Office Action dated May 18, 2007 for U.S. Appl. No. 10/489,533 (15 p.).

Office Action dated Dec. 19, 2006 for U.S. Appl. No. 10/489,533 (16 p.).

Office Action dated Jul. 17, 2006 for U.S. Appl. No. 10/489,584 (17 p.).

Office Action dated Jun. 15, 2007 for U.S. Appl. No. 10/489,584 (12 p.).

Office Action Dated Oct. 9, 2007 for U.S. Appl. No. 10/415,510; (24 p.).

Office Action Dated Nov. 13, 2007 for U.S. Appl. No. 10/489,573 (26 p.).

Office Action Dated Oct. 18, 2007 for U.S. Appl. No. 10/489,533; (15 p.).

Translation of Official Action dated Jan. 17, 2007 for Norwegian Appl. No. 20031892 (3 p.).

Partial International Search Report for Appln. No. PCT/EP02/10468; (pp. 8.).

International Search Report for Appl. No. PCT/EP02/10471 dated Sep. 18, 2002 (pp. 12).

* cited by examiner

UNIVERSAL ENERGY SUPPLY SYSTEM

CROSS-REFERENCE TO RELATED APPLICATIONS

This application is a National Phase entry of PCT Application No. PCT/EP02/10468 filed 18 Sep. 2002 which claims priority to German Application No. 201 15 473.0 filed 19 Sep. 2001 both of which are incorporated herein by reference, and is further related to U.S. application Ser. No. 10/415,510; U.S. application Ser. No. 10/836,559 filed Apr. 30, 2004; U.S. application Ser. No. 10/489,573 filed Aug. 5, 2004; U.S. application Ser. No. 10/489,533 filed Aug. 5, 2004; U.S. application Ser. No. 10/489,583 filed Aug. 5, 2004; and U.S. application Ser. No. 10/489,584 filed Aug. 5, 2004.

The present invention relates to a universal energy supply system for at least one electrical consumer comprising at least one AC voltage source and a cable connection connecting the source with the electrical consumer, wherein an AC/DC converting means is assigned to the AC voltage source for converting the AC voltage into DC voltage, which DC voltage can be supplied to the electrical consumer via the cable connection.

In the case of such a universal energy supply system as is known in practice, it has however been found that a supply is not always ensured and that the DC voltage produced is also in part not high and stable enough to guarantee, in particular, a high power supply. When the AC/DC converting means fails, the energy supply of the electrical consumer is interrupted. A redundant system with respect to the converting means is too expensive and is very difficult to realize in practice.

Furthermore, it has been found that in known energy supply systems the efficiency is comparatively poor and only in the order of about 50%. The remaining energy is here converted into heat. Corresponding cooling systems which increase the maintenance efforts and costs must be installed for discharging the heat.

It is therefore the object of the present invention to improve a universal energy supply system of the above-mentioned type in such a way that with small constructional efforts and with low costs, the energy supply to an electrical consumer is guaranteed also over great distances and a corresponding voltage supply is stabilized, the efficiency being relatively high at the same time and the system being redundant.

This object is achieved in connection with the features of the preamble of patent claim 1 in that the AC/DC converting means comprises a plurality of AC/DC converting units which are connected in parallel with the AC voltage source on the input side and serially connected to the electrical consumer on the output side, each converting unit being constructed as a clocked switch mode power supply.

Due to the use of a plurality or multitude of AC/DC converting units, each individual converting unit is only responsible for providing a specific amount of the voltage needed on the output side. If all of the converting units are of a similar construction, each individual converting unit provides, for instance, only the nth part of the necessary output voltage. In case of failure of one converting unit, the output voltage is only reduced by the nth part. This decrease in the output voltage is so small that e.g. with 10, 20, 30 or more converting units an adequate voltage supply of the electrical consumer is still ensured.

Since power and energy are distributed over many individual converting units, a corresponding power loss of each converting unit is only converted into a relatively small amount of heat. This amount can be discharged in an easy way, e.g., by air guided past the converting unit. There is no need for the use of complicated and possibly maintenance-intensive and expensive cooling systems. This is in particular true for high powers within the kW range.

The small power loss and the high efficiency of the converting units are in particular due to the fact that clocked switch mode power supplies are used as converting units. In comparison with linear controlled power supplies, these show a smaller power loss, lower weight, smaller volume, no noise development, reduced smoothing efforts and an increased input voltage range. Such switch mode power supplies are used in numerous ways, for instance in microwave ovens, computers, electronic ballast elements for fluorescent lamps, industrial and consumer electronics, screens, cardiac defibrillators, etc., and also in means which apart from a high voltage also require a high power.

The switch mode power supplies can be subdivided into primarily and secondarily clocked switch mode power supplies. The secondarily clocked switch mode power supplies include, for instance, step-down and step-up converters. However, in order to realize an electrical isolation between input and output, primarily clocked switch mode power supplies and, in particular, flyback converters may be used according to the invention as converting units. Such flyback converters are also called isolating transformers.

For instance, if the AC voltage source is a 380 V AC three-phase current source, a voltage of e.g. 6000 V that is needed on the output side can be produced by means of 30 flyback converters as the converting units, each converting unit producing 200 V DC voltage. Since the converting units on the output side are connected in series, this yields an output voltage of 30×200 V=6000 V.

Since the inputs of all converting units are however arranged in parallel, the voltage supply and thus current and power are entirely separated from one another. Since each flyback converter can be controlled or regulated individually, a highly accurate and precise regulation of the output voltage is possible in addition.

Of course, it is also possible to use less or more converting units for producing a different output voltage.

To be able to perform a corresponding clocking operation in the flyback converter in an easy way, said converter as the clocked switching means comprises at least one transistor, in particular a power MOSFET or BIMOSFET or also a thyristor.

To be able to clock the switching means in an exact and reproducible way, the switching means may be controlled for clocking by a pulse width modulation means which can in particular be controlled or regulated. This means outputs sequences of pulses which are variable in their width and/or height and/or frequency. Preferably, a pulse width modulation means may be used. In particular in the presence of an end clock flyback converter, one pulse width modulation means is sufficient, whereas two pulse width-modulated outputs are needed in the case of push-pull converters.

The power transistor in the flyback converter is controlled by a corresponding pulse signal whose duty factor is regulated in accordance with the measured actual value of the output voltage. The actual value of the voltage is subtracted from the setpoint value and this difference is supplied via a control amplifier to the pulse width modulation means. The output voltage of the control amplifier is here compared with a sawtooth-like voltage whose frequency defines the switching rate of the flyback converter. Depending on the result of the comparison, the power transistor is switched on or off and the desired output voltage is thereby adjusted. The adjustment can be made at least up to such a value that a safety distance with respect to the breakdown voltage of a component of the flyback converter, in particular the switching means, is observed.

Such an adjustment of the output voltage is of advantage, in particular, in case of failure of one or several converting units. For instance, if among the above-indicated number of 30 converting units one fails, the output voltage is only reduced by 200 V. The system as such remains operative and can supply the electrical consumer with enough power. Moreover, due to the adjustability of the output voltage of each converting unit, it is still possible to readjust the missing 200 V, advantageously, via all of the remaining converting units. Since each of the remaining converting units must only produce a minimum amount of the missing 200 V, the output voltage is each time increased by a small amount only. The converting units may here be designed such that, for instance during normal operation while all of the converting units are working, the units only output—as the output voltage—a fraction of the maximum output voltage that can be produced by them. As a result, the readjustment range is relatively large, so that several converting units may also fail without collapse of the system (redundancy).

Preferably, the flyback converter is clocked within a range of a few kilohertz to several hundred kilohertz. For instance, clock ranges of 20 kHz to 200 kHz are known for such flyback converters. If the clock frequency is here relatively high, the whole width of a corresponding oscillation of the AC voltage to be converted is scanned and used for the purpose of conversion into a corresponding DC voltage. Interference frequencies on the cable connection are also approximately within the range of the clock frequency, which results in already relatively high interference frequencies when 100 kHz are used. Such high interference frequencies do normally not affect the components of the energy supply system or the electrical consumer.

If the interference frequencies are to be shifted into an even higher frequency range, at least some of the clocked switch mode power supplies may be phase-shifted relative to one another in their clock frequencies. It is true that a natural frequency is maintained for each of the individual flyback converters, i.e., e.g. a clock frequency of 100 kHz. With this frequency direct current is fed accordingly on the secondary side into the cable. If said clocked feed is shifted by the phase shift of the clocking of individual converting units e.g. by only one nano second fraction each at the time of feed, one will obtain a cutoff frequency of the system, i.e., the cutoff frequency of the interference on the secondary side, of 100 kHz×n, n being the number of the flyback converters that are phase-shifted with respect to their clock frequency. For instance, if n equals 30, a system cutoff frequency of 3 MHz is obtained. At the same time, the amount of the interference voltage output is reduced to 1/n of the interference voltage of an individual unit.

Such a shift in the cutoff frequency of the system is in particular of considerable advantage when a data transmission takes place via the cable connection simultaneously with the energy supply. To this end a data signal coupling/decoupling means may be provided according to the invention. Said means serves both to feed data which are e.g. to be transmitted on the electrical consumers, and to decouple data received by the electrical consumers or other units of the means of the energy supply system.

Since a corresponding data signal transmission normally takes place within the range of a few 10 kHz, possible residual interferences by the system cutoff frequency are far away from any data transmission bandwidth. Troublesome filtering, e.g. by filter electrolyte capacitors, are not needed for smoothing the output voltage, and a safe data transmission that is as fast as possible is obtained on an almost undisturbed cable connection.

To make data transmission even safer, a simple filter means may be arranged between AC/DC converting unit and electrical consumer. However, this means is only used according to the invention for filtering remaining interference within the data transmission, i.e. up to a few 10 kHz, e.g. 50 kHz.

To monitor, control and optionally regulate all devices of the energy supply system and possibly also the electrical consumer via the cable connection, a controller may be assigned at least to the AC voltage source and/or the AC/DC converting means and/or the data signal coupling/decoupling means and optionally also to the electrical consumer. Such a controller yields an intelligent supply system which controls and/or regulates a great number of parameters. An example of the activity of the controller may be seen in the measure that said controller controls the flyback converters not only with respect to their output voltage, but also monitors them with respect to their function. For instance in case of failure of one flyback converter, a message may be sent by the controller to a corresponding monitoring means that one and possibly also which one of the flyback converters has failed or is impaired in its function. At the same time, the controller can control the remaining flyback converters such that they compensate for the voltage failure. A corresponding message may also be sent. After failure of a number of flyback converters the system according to the invention may also send a corresponding repair request through the controller, whereby full operability of the energy supply system would be guaranteed up to the time of the repair.

The controller may also detect further possible defects in the energy supply system and optionally also in the electrical consumers fed by the system. For instance, electrical consumers may optionally be switched on and off via the data signal connection, controlled in their operation or influenced in another way.

To permit a direct querying of different means and also of the electrical consumer via the controller at the same time, a communication connection with the respective means of the energy supply system and optionally with the electrical consumer may be established via the controller.

As for the flyback converters, it should be noted that corresponding units for the control thereof may be realized as integrated circuits which may also be contained directly in the flyback converter. Such integrated circuits may comprise corresponding means for power factor control, undervoltage detection and overcurrent monitoring. The pulse width modulation means may also contain a so-called "soft-start circuit" by which the ON period is gradually increased up to the stationary value upon application of the operating voltage.

To be able to use possibly different flyback converters and to be able to readjust all of these converters in case of failure of one flyback converter or to address each as such in the case of otherwise identical flyback converters, each individual one of the converters may be separately controlled or regulated with respect to its output voltage. This is normally carried out via the pulse width modulation means.

In particular when the various flyback converters are spatially separated from one another (the spatial distance need here only be in the order of the dimension of a flyback converter itself, there is already enough space between the individual flyback converters to guarantee cooling with respect to the heat loss only by air or water flow. Other complicated cooling systems are not needed.

Figure 2:
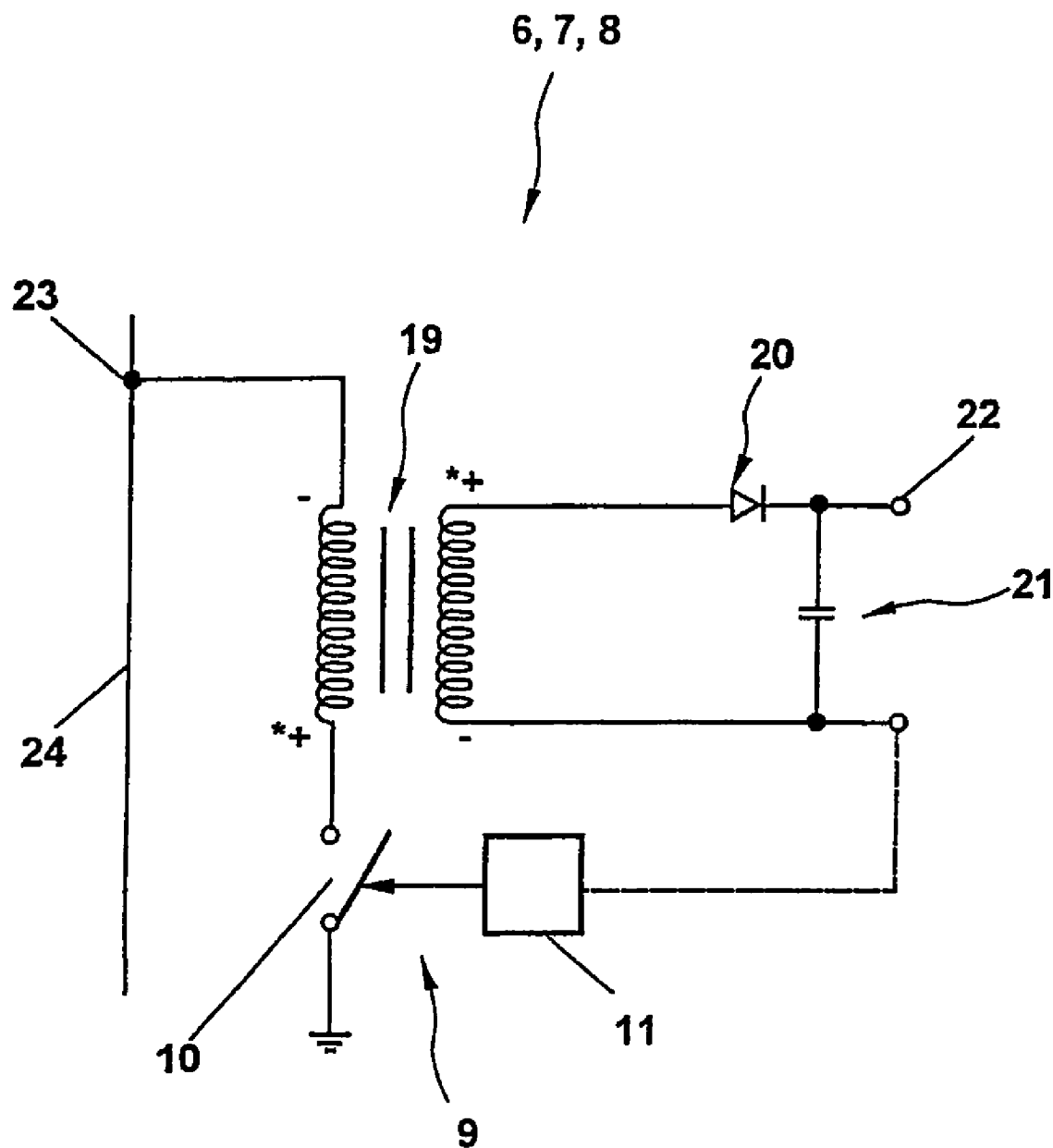

An advantageous embodiment of the invention shall now be explained in more detail in the following with reference to the figures attached to the drawing, in which:

FIG. 1 is a block diagram of an embodiment of a universal energy supply system according to the invention; and FIG. 2 is a block diagram of an embodiment of a flyback converter for use in the energy supply system according to FIG. 1.

FIG. 1 is a simplified block diagram showing an embodiment of a universal energy supply system 1 according to the invention. This system comprises a line 24 which has connected in parallel therewith input terminals 23 of an AC/DC converting unit 6 forming an AC/DC converting means 5. The line 24 is connected to a 380 V AC three-phase current source 3 as the AC voltage source.

The AC/DC converting units 6 are formed by switch mode power supplies 7 designed as flyback converters S. These are primarily clocked; see also FIG. 2 in this respect.

The various flyback converters 8 comprise corresponding circuits 16, 17, 18 for power factor control, undervoltage detection and corresponding overcurrent monitoring. Said circuits may be part of the flyback converter or assigned to each of the flyback converters.

Of course, all flyback converters according to FIG. 1 may be provided with such an integrated circuit or integrated circuits.

On the output side, the flyback converters 8 are connected with an output terminal 22 in series with the cable connection 4 formed by a coaxial cable 15. Even in the case of a thin cross-section, considerable power and a large amount of data can be transmitted via such a coaxial cable over a large distance in the range of 50, 60, 70 or more kilometers. Due to the thin cross-section for such coaxial cables 15, said cross section resulting from the supply with DC voltage, the cable connection is much cheaper in comparison with known cable connections via which alternating current is transmitted.

Subsequent to the AC/DC converting means 5, the coaxial cable 15 comprises a filter means 12. Said filter means filters remaining interference within the frequency range of up to a few 10 kHz, which interference might disturb a data transmission via the coaxial cable 15.

A data signal coupling/decoupling means 13 is arranged between the filter means 12 and the at least one electrical consumer 2 supplied by the universal energy supply system 1 according to the invention with DC voltage and high power. Corresponding data signals are coupled via said means 13 into the coaxial cable 15, or data signals transmitted by other means via the coaxial cable 15 are decoupled by said means 13. An interference-free data transmission at a high speed is thereby made possible according to the invention via the coaxial cable. It should here be noted that the cutoff frequency of the system is shifted by a phase shift of the frequencies of the individual ones of the flyback converters 8 into the range of MHz, so that said cutoff frequency is far away from any data transmission bandwidth and a reliable data transmission at a high speed is thereby possible.

The electrical consumer 2 may e.g. be an actuator, and it is self-evident that several electrical consumers 2 can be supplied accordingly via the coaxial cable 15 with both power and data. Such an actuator serves e.g. to control means along a fluid line. The corresponding means and actuators, respectively, for the actuation thereof are normally arranged at places which are difficult to reach or are impassable and confined. The fluid can flow at a high pressure into or through the fluid line, so that e.g. one means is an emergency shut-off unit which in case of leakage in the fluid line prevents possibly aggressive or environmentally harmful fluid from exiting into the environment. Further means for actuation by the actuators are valves, throttles, pumps, or the like. As a rule, the actuators require much power because the fluid flows at a high pressure and possibly also with a large quantity through the fluid line or into the same. It is also possible to provide a corresponding shut-off device already during inflow, i.e. substantially at the source of the fluid, to prevent an uncontrolled outflow of the fluid into the environment.

Of course, it is here of advantage when corresponding parameters of the actuators and of the means controlled by them, e.g. positions of the valve, shut-off device, action of the pumps, or the like, can be queried and monitored through the communication connection.

The control of the communication connection and the monitoring of all means takes place via a controller 14 which is connected to all of the corresponding means and also to the electrical consumers 2.

FIG. 2 shows an embodiment of a flyback converter 8 as is used in the AC/DC converting units 6 according to FIG. 1.

The flyback converter 8 comprises a primary and secondary winding as the transformer 19. The primary winding is wired at one of its ends with the input terminal 23 and at its other end with the switching means 9. The switching means 9 is designed as a power MOSFET 10. Furthermore, it is possible to design the switching means 9 as a BIMOSFET or as a power thyristor.

The secondary winding is wired via a diode 20 with the output terminal 22, the corresponding output terminals 22 of all flyback converters 8 according to the FIG. 1 being arranged such that these are serially connected with the coaxial cable 15. The input terminals 23 are wired accordingly such that all flyback converters 8 are connected in parallel with the line 24.

A capacitor 21 is wired in parallel with the secondary winding. Furthermore, the flyback converter 8 comprises a pulse width modulation means 11 for clocking the switching means 9.

In the circuit shown in FIG. 2, the transformer 19 acts as a magnetic energy store. In the activated state of the switching means 9, the current in the primary winding rises and energy is stored in the transformer. When the switching means 9 is opened, see FIG. 2, the stored energy is transmitted to the secondary winding of the transformer 19 and further to the smoothing capacitor. The smoothed DC voltage can be output via the output terminal 22 to the cable connection 4. The output voltages output by each of the flyback converters 8 according to FIG. 1 are added to obtain the total system voltage.

The pulse width modulation means 11 has already been described further above and serves to adjust, in particular, the output voltage of each flyback converter. The maximum output voltage is normally defined by the breakdown voltage of the switching means 9 and the corresponding power MOSFET 10, respectively. Attention must here be paid that the breakdown voltage of the control means is normally at least twice as high as the maximum supply voltage. This means that at 380 V AC three-phase current the breakdown voltage is about 800 V.

Accordingly, it is possible to precisely regulate the power for an electrical consumer with the associated voltage and to carry out the regulating operation with a multitude of flyback converters. Moreover, the phase shift in the clocking of each flyback converter yields a very high cutoff frequency of the system which permits an interference-free data transmission via the corresponding cable connection also over long cable distances and even in the case of a thin cross-section of the cable at a high speed.

In case of failure of one or several flyback converters, the remaining flyback converters are just readjusted with respect to their output voltage, so that an adequate voltage and power supply on the output side is still provided for the corresponding electrical consumers.

The system according to the invention offers a number of advantages over e.g. only one flyback converter used as the AC/DC converting means, which must provide the whole power and voltage on the output side; as a rule only voltages of up to less than 3000 V are possible on the output side because the electric strength of the corresponding components is below 3000 V breakdown voltage. According to the invention the output voltage may be 3000 V, 6000 V, or more.

The invention claimed is:

1. A universal energy supply system for at least one electrical consumer, comprising:
   at least one AC voltage source;
   a cable connection connecting the AC voltage source with the electrical consumer; and
   an AC/DC converter coupled between the AC voltage source and the at least one electrical consumer, wherein the AC/DC converter is operable to convert an AC voltage into DC voltage, which DC voltage is supplied to the electrical consumer via the cable connection and wherein the AC/DC converter comprises;
   a number of AC/DC converting units which are connected in parallel, on an input side, with the AC voltage source and which are serially connected to the electrical consumer on an output side, wherein each AC/DC converting unit has a primary and secondary winding and has a switch that, when closed, enables energy from the AC source to be stored in the primary winding and that, when open, enables energy stored in the primary winding to be transmitted to the secondary winding.

2. A universal energy supply system according to claim 1 wherein each AC/DC converting unit comprises at least one component selected from the group consisting of a power factor controller, an undervoltage detector, and an overcurrent monitor.

3. A universal energy supply system according to claim 1 wherein an output voltage of each individual AC/DC converting unit is controlled separately and further including a controller to detect a failure of an AC/DC converter unit and to cause other AC/DC converter units to compensate for failed AC/DC converter units by increasing output voltages.

4. A universal energy supply system for at least one electrical consumer, comprising:
   at least one AC voltage source;
   a cable connection connecting the AC voltage source with the electrical consumer; and
   an AC/DC converter coupled between the AC voltage source and the at least one electrical consumer, wherein the AC/DC converter is operable to convert an AC voltage into DC voltage, which DC voltage is supplied to the electrical consumer via the cable connection and wherein the AC/DC converter comprises
   a number of AC/DC converting units which are connected in parallel, on an input side, with the AC voltage source and which are serially connected to the electrical consumer on an output side, wherein each AC/DC converting unit is constructed as a clocked flyback converter having a first state for storing energy from the AC voltage source on the input side and a second state for transmitting stored energy from the input side to the output side.

5. A universal energy supply system according to claim 4 wherein the flyback converter comprises a clocked switching device.

6. A universal energy supply system according to claim 5 wherein the clocked switching device is clocked according to a controllable pulse width modulator.

7. A universal energy supply system according to claim 5 wherein an output voltage of each flyback converter is adjustable to any value up to a limit value below the breakdown voltage of a component of the clocked switching device.

8. A universal energy supply system according to claim 5 wherein a clock frequency of the clocked switching device is within a range between one kilohertz and a few hundred kilohertz.

9. A system for supplying power to an electrical device, the system comprising:
   an AC source;
   a plurality of AC/DC converters, wherein inputs of the AC/DC converters are connected to the AC source and wherein outputs of the AC/DC converters are connected to the electrical device via an electrical conductor; and
   a data coupling device coupled to the electrical conductor, wherein the data coupling device communicates with the electrical device via signals associated with a first frequency range while power is supplied to the electrical device via the electrical conductor,
   wherein clocking frequencies associated with one or more of the AC/DC converters are phase shifted with respect to each other to shift clocking noise from the first frequency range to a second frequency range.

10. The system of claim 9 wherein the plurality of AC/DC converters supply a high DC voltage to the electrical device via the electrical conductor without a cooling mechanism that would otherwise be needed when less than the plurality of AC/DC converters are implemented to supply the high DC voltage to the electrical device.

11. The system of claim 10 wherein the AC/DC converters are in a spaced relationship with each other such that heat from the AC/DC converters is dissipated without the need of a cooling component.

12. The system of claim 9 further comprising a controller coupled to each of the AC/DC power converters, wherein the controller regulates one or more functions of each AC/DC power converter.

13. The system of claim 12 wherein the controller detects a failure of an AC/DC converter and causes other AC/DC converters to compensate for the failed AC/DC converter.

14. The system of claim 12 wherein the controller independently controls an output power of each AC/DC converter.

15. The system of claim 12 wherein each AC/DC converter includes a switching mechanism that permits each AC/DC converter to be clocked independently of a frequency of the AC source.

16. The system of claim 15 wherein each AC/DC converter includes a pulse width modulator coupled to the switching mechanism wherein the controller controls the pulse width modulator such that the switching mechanism is clocked according to a pulse width modulated signal.

* * * * *